(12) United States Patent
Klein

(10) Patent No.: US 7,504,608 B2
(45) Date of Patent: Mar. 17, 2009

(54) LENS ADJUSTMENT ASSEMBLY HAVING AN ELECTRICALLY ACTIVE POLYMER

(75) Inventor: Dean A. Klein, Eagle, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 64 days.

(21) Appl. No.: 11/513,265

(22) Filed: Aug. 31, 2006

(65) Prior Publication Data

US 2008/0054155 A1 Mar. 6, 2008

(51) Int. Cl.
*G01J 1/20* (2006.01)
(52) U.S. Cl. .................... 250/201.1; 396/133
(58) Field of Classification Search .......... 250/201.1, 250/216; 396/133
See application file for complete search history.

(56) References Cited

U.S. PATENT DOCUMENTS

| 2004/0114203 A1 | 6/2004 | Batchko |
| 2004/0234257 A1* | 11/2004 | McKevitt et al. ............ 396/133 |
| 2006/0114534 A1 | 6/2006 | Batchko |

* cited by examiner

*Primary Examiner*—Georgia Y Epps
*Assistant Examiner*—Kevin Wyatt
(74) *Attorney, Agent, or Firm*—Dickstein Shapiro LLP

(57) ABSTRACT

A lens assembly and method of adjusting a lens assembly using an electrically active polymer element. The assembly comprises a lens; a pixel array for receiving an image through said lens via an optical path; a moveable element for changing the optical properties of said optical path; and at least one electrically active polymer for changing volume in response to an applied voltage, said polymer being coupled to said moveable element such that changes in volume of said polymer causes movement of said moveable element.

26 Claims, 8 Drawing Sheets

LENS ADJUSTMENT ASSEMBLY HAVING AN ELECTRICALLY ACTIVE POLYMER

BACKGROUND OF THE INVENTION

The present invention relates to imaging devices, and specifically to imaging devices employing an adjustable focus or zoom assembly.

Conventional lens adjustment assemblies move one or more lenses or an image sensor mechanically in a linear direction toward and away from one another to adjust zoom and focus. These conventional assemblies use known electromechanical or piezoelectric techniques which typically contain many moving parts making the lens adjustment assembly complex and expensive, particularly as image sensor sizes decrease.

Accordingly, there is a desire and need for a lens adjustment assembly, to be used with an imaging device, that mitigates against these shortcomings.

BRIEF DESCRIPTION OF THE DRAWINGS

Advantages and features of the invention will become more apparent from the detailed description of embodiments provided below with reference to the accompanying drawings in which.

DETAILED DESCRIPTION OF THE INVENTION

In the following detailed description, reference is made to various specific embodiments in which the invention may be practiced. These embodiments are described with sufficient detail to enable those skilled in the art to practice the invention, and it is to be understood that other embodiments may be employed, and that structural and electrical changes may be made without departing from the spirit or scope of the present invention.

Embodiments of the invention employ an electrically active element, such as an electrically active polymer, which is enclosed within a chamber containing a non-compressible fluid and which is responsive to electrical signals to expand or contract which causes displacement of the fluid to move at least a portion of the wall of the chamber for zoom and/or focus adjustment of a lens.

Figure 1A:
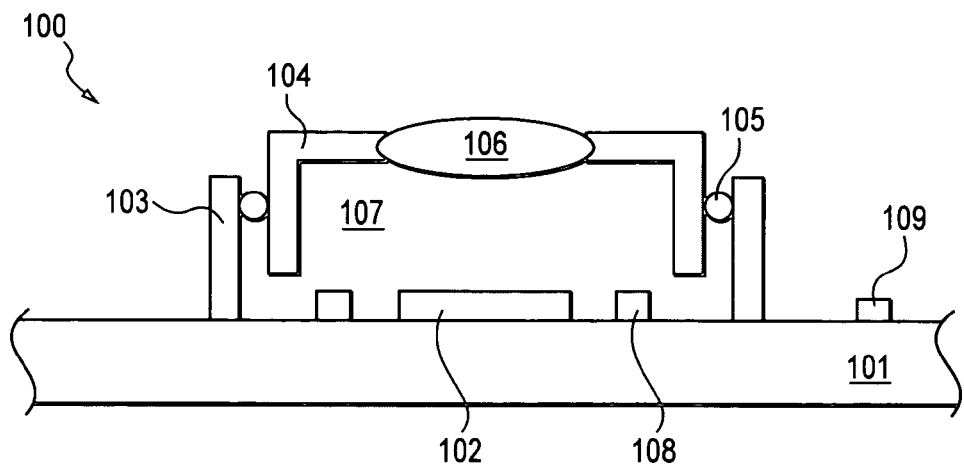
FIG. 1A is a cross-sectional view of an imager having a lens adjustment assembly according to an embodiment.

FIG. 1A is a cross-sectional view of an imager 100 having a lens adjustment assembly according to a first embodiment. Imager 100 includes a substrate 101 supporting an imaging array 102. In the illustrated embodiment, the imaging array 102 is shown as fabricated on top of substrate 101, but for this and other embodiments, the array 102 may also be fabricated directly within semiconductor substrate 101 along with other images and/or camera circuitry, if desired. Imager 100 also includes one or more electrically active polymer ("EAP") elements 108 and a lens adjustment assembly comprising a support structure 103, a lens housing 104, a sealing portion 105 and a lens 106, enclosing the imaging array 102, EAP element 108 and a volume of transparent fluid 107 having a known index of refraction. In the illustrated embodiment, the support structure 103, housing 104 and sealing portion 105 are concentric rings which surround the lens 106, but may be in any desired shape or configuration. In the illustrated embodiment, a single, ring-shaped EAP element 108 which encircles the array 102 is used.

Suitable EAP elements 108 include electrostatically driven polymers such as ionomers. Suitable fluids 107 include perflourinated polyether (PFPE) fluids, a family of inert fluids having stable indexes of refraction. These EAP elements and fluids may be utilized in any of the described embodiments.

The housing 104 and lens 106 move vertically toward and away from the array 102 in response to changes in volume of the enclosed EAP element 108. The sealing portion 105 is interposed between the housing 104 and the support structure 103 to keep the array 102, volume of liquid 107 and EAP element 108 in a fluid tight sealing relationship. In order to move the housing 104 and lens 106 vertically upward with respect to the array 102, a voltage is applied to the EAP element 108 by control circuitry, for operating array 102 which, for example, may be fabricated in the substrate 101, thereby causing the EAP element 108 to expand and move the fluid 107. The fluid 107 presses on the lens 106 and housing 107.

Figure 1B:
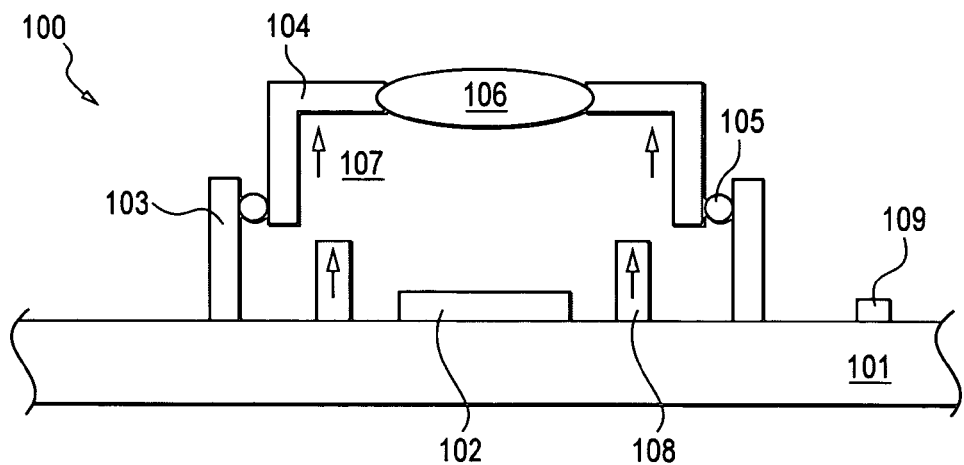
FIG. 1B is a cross-sectional view of the imager of FIG. 1A illustrating the activation of an electrically active polymer element within the assembly.

As illustrated by FIG. 1B, the activated EAP element 108 expands in response to the applied voltage. The pressure of the enclosed volume of liquid 107 increases and the liquid 107, unable to compress to compensate for the expanded EAP element 108, and unable to escape past the sealing portion 105, forces the housing 104 and lens 106 vertically upward in proportion to the volumetric change of the activated EAP element 108 in order to bring the pressure of the volume of liquid 107 into equilibrium with the outside environment (typically air).

The EAP element 108 is deactivated by removing the applied voltage, thereby returning the deactivated EAP element 108 to its original volume. The decrease in volume of the deactivated EAP element 108 decreases the pressure of the liquid 107 and moves the assembly in a downward vertical direction back towards the array 102. Thus, by variably controlling the voltage applied to EAP element 108 a variably controlled movement of lens 106 can be obtained.

The enclosed volume of fluid 107 has two uses. First, the fluid 107 in this embodiment is non-compressible, thereby maintaining the volume of the enclosed portion of the imager 100 at a constant level, allowing for exact adjustment of the lens assembly. Second, the index of refraction of the liquid 107 is greater than that of air, allowing for designs that permit the lens 106 to be positioned closer to the array 102 than would be otherwise practical.

Although an non-compressible liquid is used in the illustrated embodiment for the volume of liquid 107, any liquid or gas having known compressibility properties may also be used. However, as the compressibility of the liquid or gas increases, more accurate control over the volumetric expansion of the EAP element 108 is required.

Controlling the activation of the EAP element 108 may be achieved in a number of ways. In the embodiment illustrated in FIGS. 1A-1B, a single EAP element 108 encircles the horizontal perimeter of the array 102 and is linearly responsive to an applied voltage. Thus, a desired increase in volume of the EAP element 108 is directly proportional to the applied voltage; the increase in volume of the EAP element 108 proportionally increases the pressure of the volume of liquid 107, which in turn proportionally moves the assembly 104 and lens 106 up and away from the array 102. Accordingly, the change in focal distance of the lens 106 from the array 102 is directly proportional to the voltage applied to the EAP element 108. Other embodiments may include a plurality of EAP element 108, each responsive to a fixed voltage, variable voltages, or a combination thereof in order to achieve the desired change in volume and movement of lens 106 relative to the array 102.

In the illustrated embodiment, for simplicity, the EAP element 108 is illustrated as increasing in volume in the vertical linear direction (see FIG. 1B), but an increase in volume in any direction, or more than one direction, will enable movement of the lens 106 relative to the array 102. The EAP element 108 may be formed in other embodiments in a manner allowing for expansion in any or all directions. As long as the changes in volume of the EAP element 108 are measurable and as long as the expansion of the EAP element 108 does not obscure or obstruct the transmission of light to or from the imager array 102, the direction of expansion of the EAP element 108 is generally not relevant to the operation of the imager 100.

Additionally, in the illustrated embodiment, the outside environment is air at atmospheric pressure, which is variable according to elevation and atmospheric conditions. In general, atmospheric pressure will not vary quickly enough to have a noticeable effect on the positioning of the housing 104 and lens 106, but where exact positioning is required, for example, where a preset focal distance between the lens 106 and array 102 must be associated with a specific voltage or combination of voltages to be applied to the EAP element 108, continuous monitoring of image focus may be performed by the imager or other associated circuitry (not shown) and corrective voltage may be applied to the EAP element 108.

It should be noted that the accompanying figures are not drawn to scale. Specifically, the upward movement of the assembly 104 and lens 106 shown in FIG. 1B will correspond with the volumetric change in EAP element 108, and will not necessarily be proportional to the upward extension of the EAP element 108.

Figure 2A:
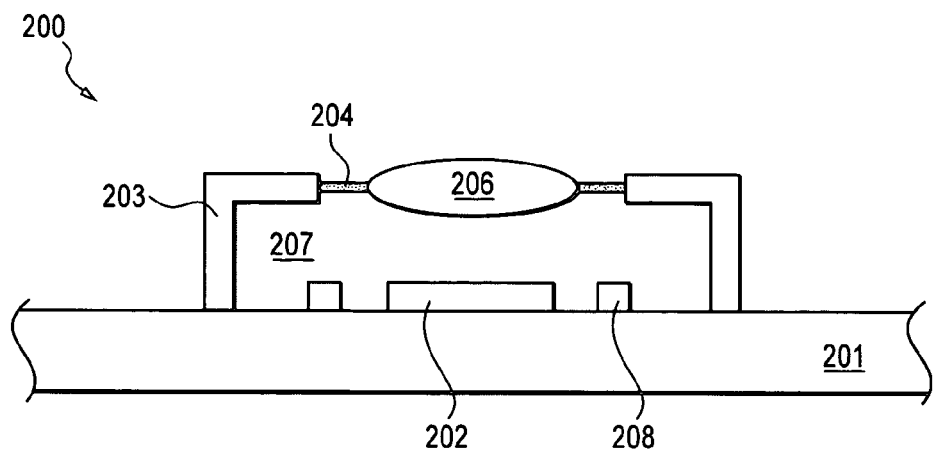
FIG. 2A is a cross-sectional view of an imager having a lens adjustment assembly according to another embodiment.

FIG. 2A is a cross-sectional view of an imager 200 having a lens adjustment assembly according to another embodiment. In the illustrated embodiment, imager 200 includes a substrate 201 comprising an imaging array 202. Imager 200 also includes one or more EAP elements 208 and a lens adjustment assembly comprising a support structure 203, an elastic lens housing 204 and a lens 206, enclosing the imaging array 202, EAP element 208 and a volume of transparent fluid 207 having a known index of refraction.

Figure 2B:
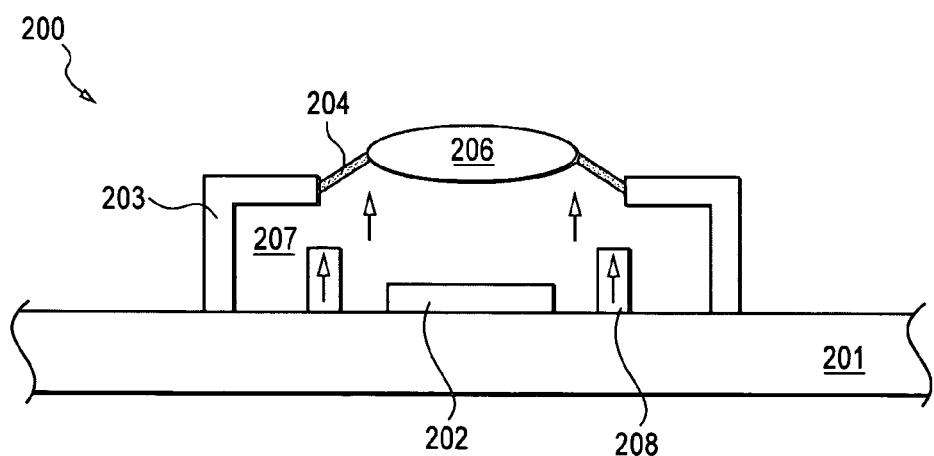
FIG. 2B is a cross-sectional view of the imager of FIG. 2A illustrating the activation of an electrically active polymer element within the assembly.

As shown in FIG. 2B, and in a technique similar to the embodiment shown in FIGS. 1A-1B, the EAP element 208 may be activated as discussed above, thereby increasing the pressure of the volume of fluid 207. The elastic housing 204 stretches as the lens 206 is pushed upward and outward to compensate for and to equalize the increase in pressure. In this and other illustrated embodiments, the lens 206 is rigid, but in this or other embodiments, the lens 206 may be flexible if desired. In another embodiment, the elasticity of the lens housing 204 may also be taken into account when calculating the appropriate voltage or combination of voltages to be applied to the EAP element 208.

Figure 3A:
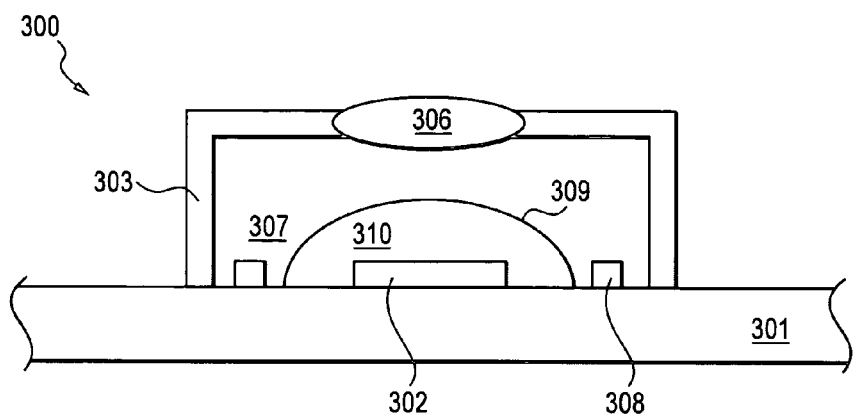
FIG. 3A is a cross-sectional view of an imager having a lens adjustment assembly according to another embodiment.

FIG. 3A is a cross-sectional view of an imager 300 having a lens adjustment assembly according to another embodiment. In this embodiment, imager 300 includes a substrate 301 supporting an imaging array 302. Imager 300 also includes one or more EAP elements 308, and a fixed lens housing 303 and lens 306 enclosing the imaging array 302, EAP element 308, a first volume of transparent fluid 307 having a first index of refraction, and a transparent elastic membrane 309 enclosing the array 302 and a second volume of transparent fluid (either liquid or gas) 310 having a second index of refraction different from the first index of refraction. Suitable fluids for the second fluid 310 include PFPE fluids as described above, or nitrogen gas or dry air.

Figure 3B:
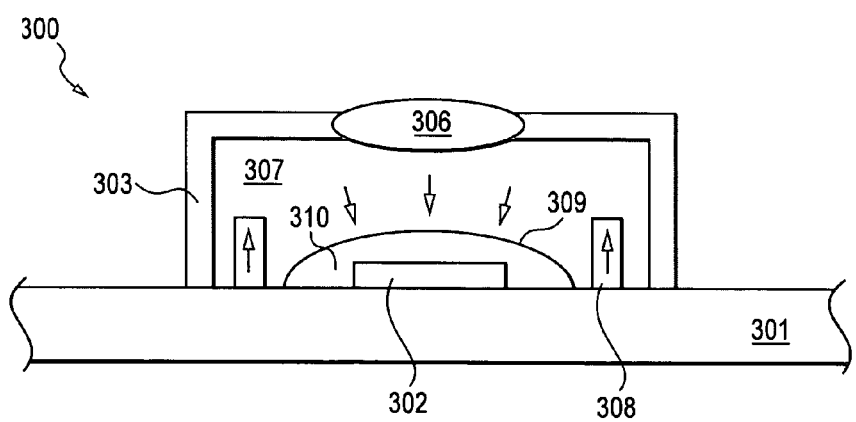
FIG. 3B is a cross-sectional view of the imager of FIG. 3A illustrating the activation of an electrically active polymer element within the assembly.

As shown by FIG. 3B, and in a technique similar to the embodiments shown in FIGS. 1A, 1B, 2A and 2B, the EAP element 308 may be activated by applied voltage as discussed above, thereby increasing the pressure on the first volume of fluid 307. The second fluid 310 is compressed accordingly as the pressure of the first fluid and second fluids 307, 310 reach equilibrium, altering the shape and positioning of the elastic membrane 309 accordingly. The membrane 309 may be formed of PDMS or PET material having a thickness between 10 and 50 microns.

As the second fluid 310 is compressed, the focal distance between the lens 306 and the elastic membrane 309 increases, and the focal distance between the elastic membrane 309 and the array 302 decreases by the same amount. The change in focal distances between the lens 306 and membrane 309 and between the membrane 309 and array 302 changes the focus and/or zoom properties of the lens 306 due to the different indexes of refraction of the two fluids 307, 310. Additionally, the membrane 309 may be formed so that its optical properties vary as the second fluid 310 compresses or expands.

Therefore, the focus and zoom settings for the captured image can be controlled without physically moving the lens 306. This embodiment has the additional advantage of sealing the first and second fluids 307, 310 within the rigid housing 303, lens 306 and substrate 301 structure. This reduces the effect of atmospheric pressure on the operation of the imager 300.

Figure 4A:
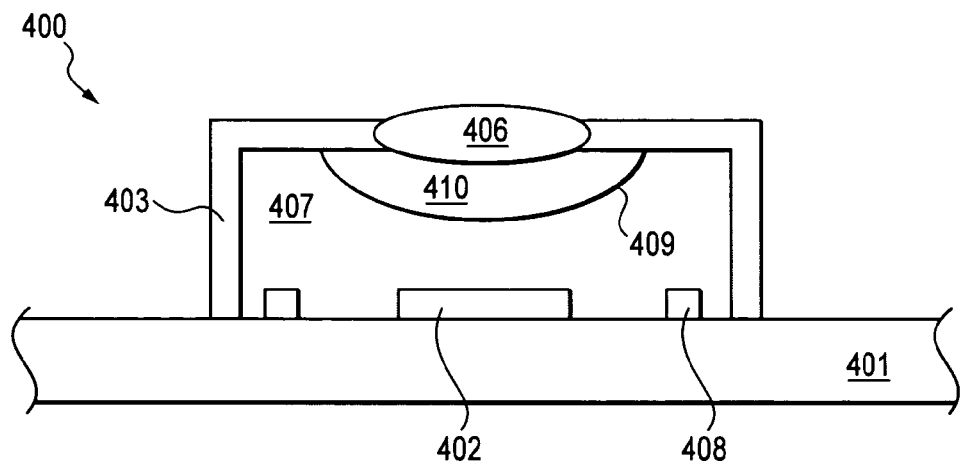
FIG. 4A is a cross-sectional view of an imager having a lens adjustment assembly according to another embodiment.

FIG. 4A is a cross-sectional view of an imager 400 having a lens adjustment assembly according to another embodiment. In the illustrated embodiment, imager 400 includes a substrate 401 supporting an imaging array 402. Imager 400 also includes one or more EAP elements 408, and a fixed lens housing 403 and lens 406 enclosing the imaging array 402, EAP element 408, a first volume of transparent fluid 407 having a first index of refraction, and a transparent elastic membrane 409 enclosing the lens 406 and a second volume of compressible fluid 410 having a second index of refraction different from the first index of refraction.

Figure 4B:
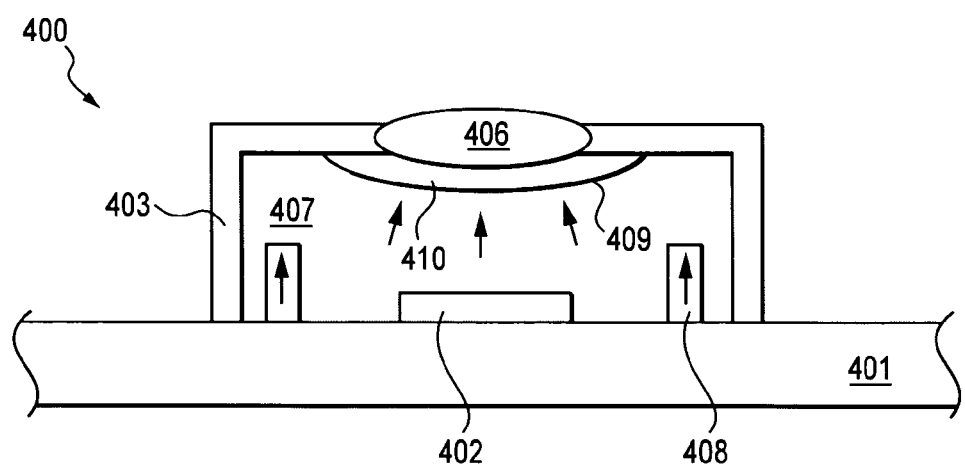
FIG. 4B is a cross-sectional view of the imager of FIG. 4A illustrating the activation of an electrically active polymer element within the assembly.

As shown by FIG. 4B, and in a technique similar to the FIGS. 3A, 3B embodiment discussed above, the EAP element 408 may be activated by applied voltage, thereby increasing the pressure on the first volume of fluid 407. The second volume of compressible liquid or gas 410 is compressed accordingly as the pressure equalizes between the elastic membrane 409.

Similar to FIGS. 3A and 3B, as the second volume of matter 410 is compressed, the focal distance between the lens 406 and the elastic membrane 409 decreases, and the focal distance between the elastic membrane 409 and the array 402 increases by the same amount. The change in focal distances of these two materials having different indexes of refraction changes the focus and/or zoom properties of the lens 406.

Figure 5:
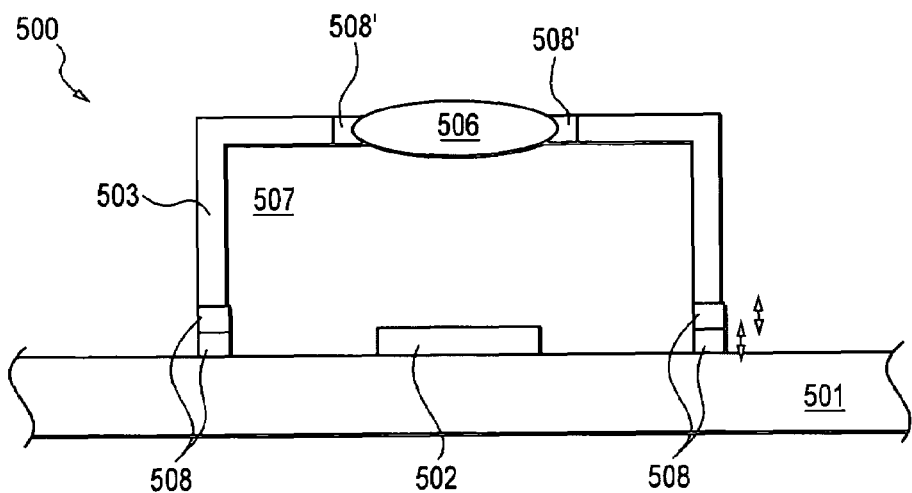
FIG. 5 is a cross-sectional view of an imager having a lens adjustment assembly according to another embodiment.

FIG. 5 is a cross-sectional view of an imager 500 having a lens adjustment assembly according to another embodiment. In the illustrated embodiment, imager 500 includes a substrate 501 comprising an imaging array 502. Imager 500 also includes one or more vertical EAP elements 508, interposed between the substrate 501 and a fixed lens housing 503 for vertical adjustment of a lens 506, and one or more horizontal EAP elements 508' interposed between the fixed lens housing 503 and the lens 506 for horizontal adjustment of the lens 506. The vertical and horizontal EAP elements 508, 508', housing 503 and lens 506 may enclose the imaging array 502 and a first volume of transparent fluid or gas 507, but as will become apparent this is not necessary.

In this embodiment, one or more of the vertical EAP elements 508 are activated in order to move the housing 503 and lens 506 in a vertical direction with respect to the array 502. The vertical EAP elements 508 can be activated individually and/or proportionally by applied voltage as discussed above in order to obtain varying degrees of focus or zoom. Additionally, one or more of the horizontal EAP elements 508' may be selectively activated by applied voltage to adjust the horizontal placement of the lens 506 as desired. This horizontal adjustment feature adds additional optical control over the incoming light and may be combined with any of the other disclosed embodiments.

Figure 6:
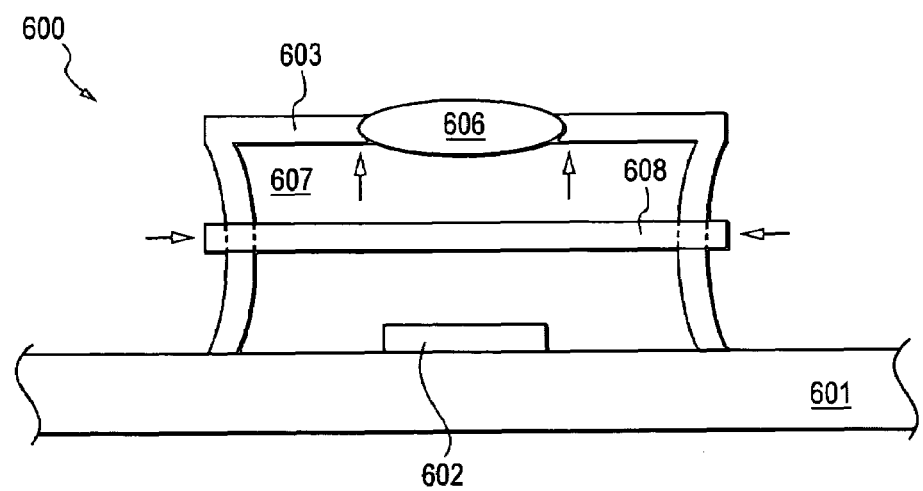
FIG. 6 is a cross-sectional view of an imager having a lens adjustment assembly according to another embodiment.

FIG. 6 is a cross-sectional view of an imager 600 having a lens adjustment assembly according to another embodiment. In the illustrated embodiment, imager 600 includes a substrate 601 supporting an imaging array 602. Imager 600 also includes one or more EAP elements 608 encircling an outer perimeter of a flexible lens housing 603 holding a lens 606. Current may be applied by wires (not shown) formed within the lens housing 603 or by conventional leads. The housing 603 and lens 606 may enclose the imaging array 602 and a first volume of transparent fluid (e.g., liquid or gas) 607. It should be appreciated, however, that the presence of fluid 607 is not necessary to practice the illustrated embodiment because all necessary movement of the housing 603 may be effected by EAP elements 608 alone.

In the illustrated embodiment, one or more EAP elements 608 are activated by applied voltage in order to expand the flexible housing 603, thereby causing the lens 606 to move vertically toward the array 602. Deactivating or reducing the voltage applied to the EAP element 608 constricts the flexible housing, thereby causing the lens 606 to move vertically away from the array 602. Each EAP element 608 can be activated individually and/or proportionally as discussed above in order to obtain varying degrees of focus or zoom.

Figure 7:
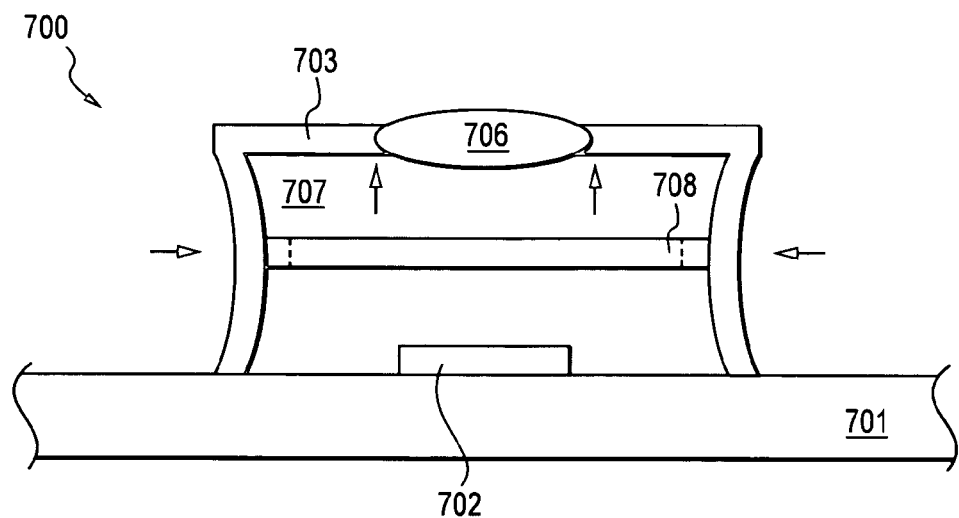
FIG. 7 is a cross-sectional view of an imager having a lens adjustment assembly according to another embodiment.

FIG. 7 is a cross-sectional view of an imager 700 having a lens adjustment assembly according to another embodiment. In the illustrated embodiment, imager 700 includes a substrate 701 supporting an imaging array 702. Imager 700 also includes one or more EAP elements 708 encircling an inner perimeter of a flexible lens housing 703 holding a lens 706. The housing 703 and lens 706 may enclose the imaging array 702, the EAP element 708 and a first volume of transparent fluid (e.g., liquid or gas) 707. It should be appreciated, however, that the presence of fluid 707 is not necessary to practice the illustrated embodiment because all necessary movement of the housing 703 may be effected by EAP elements 708 alone.

In this embodiment, one or more of the EAP elements 708 are activated by applied voltage in order to expand the perimeter of the flexible housing 703, thereby causing the lens 706 to move vertically toward the array 702. Deactivating or reducing the voltage applied to the EAP element 708 allows the perimeter flexible housing to constrict, thereby causing the lens 706 to move vertically away from the array 702. Each EAP element 708 can be activated individually and/or proportionally as discussed above in order to obtain varying degrees of focus and/or zoom. In another embodiment, EAP elements may be disposed around the inner and outer perimeters of the flexible housing 703 simultaneously.

Figure 8:
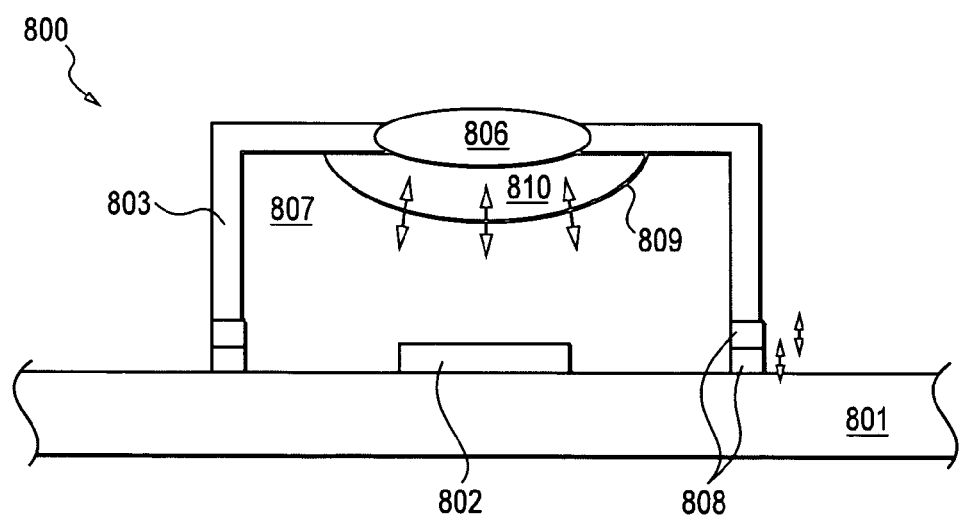
FIG. 8 is a cross-sectional view of an imager having a lens adjustment assembly according to another embodiment.

FIG. 8 is a cross-sectional view of an imager 800 having a lens adjustment assembly according to another embodiment. In the illustrated embodiment, imager 800 includes a substrate 801 supporting an imaging array 802. Imager 800 also includes one or more EAP elements 808, and a lens housing 803 and lens 806 enclosing the imaging array 802, EAP element 808, a first volume of transparent fluid 807 having a first index of refraction, and a transparent elastic membrane 809 enclosing the lens 806 and a second volume of compressible fluid 810 having a second index of refraction different from the first index of refraction.

In a technique similar to the embodiments discussed above, the EAP element 808 may be activated by applied voltage, thereby raising the housing 803 in a manner similar to the embodiment shown in FIG. 7, and thus decreasing the pressure on the first volume of fluid 807 and increasing the pressure on the second volume of fluid in a manner similar to the embodiment shown in FIGS. 4A and 4B. The second volume of compressible liquid or gas 810 is decompressed accordingly as the pressure equalizes between the elastic membrane 809.

As the second volume of matter 810 is decompressed, the focal distance between the lens 406 and the elastic membrane 809 increases, and the focal distance between the elastic membrane 809 and the array 802 decreases by the same amount minus the increase in focal distance caused by the expansion of the EAP elements 808. The change in focal distances of these two materials having different indexes of refraction changes the focus and/or zoom properties of the lens 806.

In a modification of the FIG. 8 embodiment, the transparent elastic membrane can enclose the pixel array 802 instead of lens 806.

The lens adjustment mechanism illustrated in the illustrated embodiments above may by used with any type of solid state imager providing an array of pixels for image capture.

Figure 9:
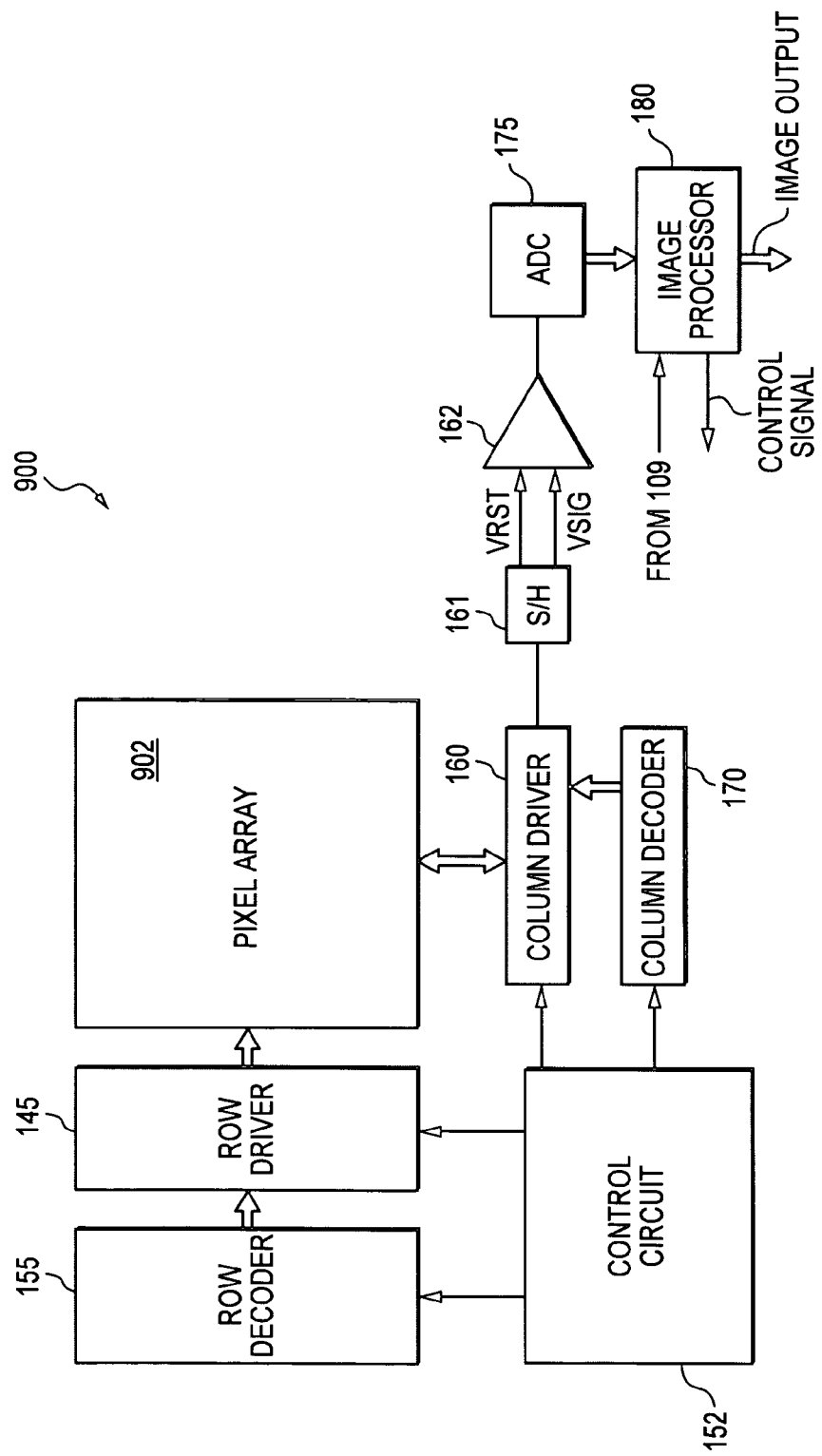
FIG. 9 is a top-down illustration of portion of a CMOS imager employing a lens adjustment assembly according to an embodiment of the present invention.

FIG. 9 illustrates a block diagram of an imager 900 constructed in accordance with one of or a combination of the embodiments described above. The imager 900 may be a CMOS imager, but, as noted, the imager can be any type of imager. The imager 900 contains a pixel array 902 and employs a lens adjustment assembly according to one of or a combination of the embodiments shown in FIGS. 1A-7. Attached to the pixel array 902 is signal processing circuitry for controlling the pixel array 902. The pixel cells of each row in array 902 are all turned on at the same time by a row select line, and the pixel cells of each column are selectively output by respective column select lines. A plurality of row select and column select lines are provided for the entire array 902. The row lines are selectively activated by a row driver 145 in response to row address decoder 155. The column select lines are selectively activated by a column driver 160 in response to column address decoder 170. Thus, a row and column address is provided for each pixel cell.

The imager 900 is operated by a timing and control circuit 152, which controls address decoders 155, 170 for selecting the appropriate row and column lines for pixel readout. The control circuit 152 also controls the row and column driver circuitry 145, 160 such that they apply driving voltages to the drive transistors of the selected row and column lines. The pixel column signals, which typically include a pixel reset signal $V_{rst}$ and a pixel image signal $V_{sig}$, are output to column driver 160, on output lines, and are read by a sample and hold circuit 161. $V_{rst}$ is read from a pixel cell immediately after the pixel cell's floating diffusion region is reset. $V_{sig}$ represents the amount of charges generated by the photosensitive element of the pixel cell in response to applied light during an integration period. A differential signal ($V_{rst}-V_{sig}$) is produced by differential amplifier 162 for each readout pixel cell. The differential signal is digitized by an analog-to-digital converter 175 (ADC). The analog to digital converter 175 supplies the digitized pixel signals to an image processor 180, which forms and outputs a digital image. The image processor, if it controls the image capture process, may be used to provide output signals to control the EAP elements in the embodiments discussed above.

Figure 10:
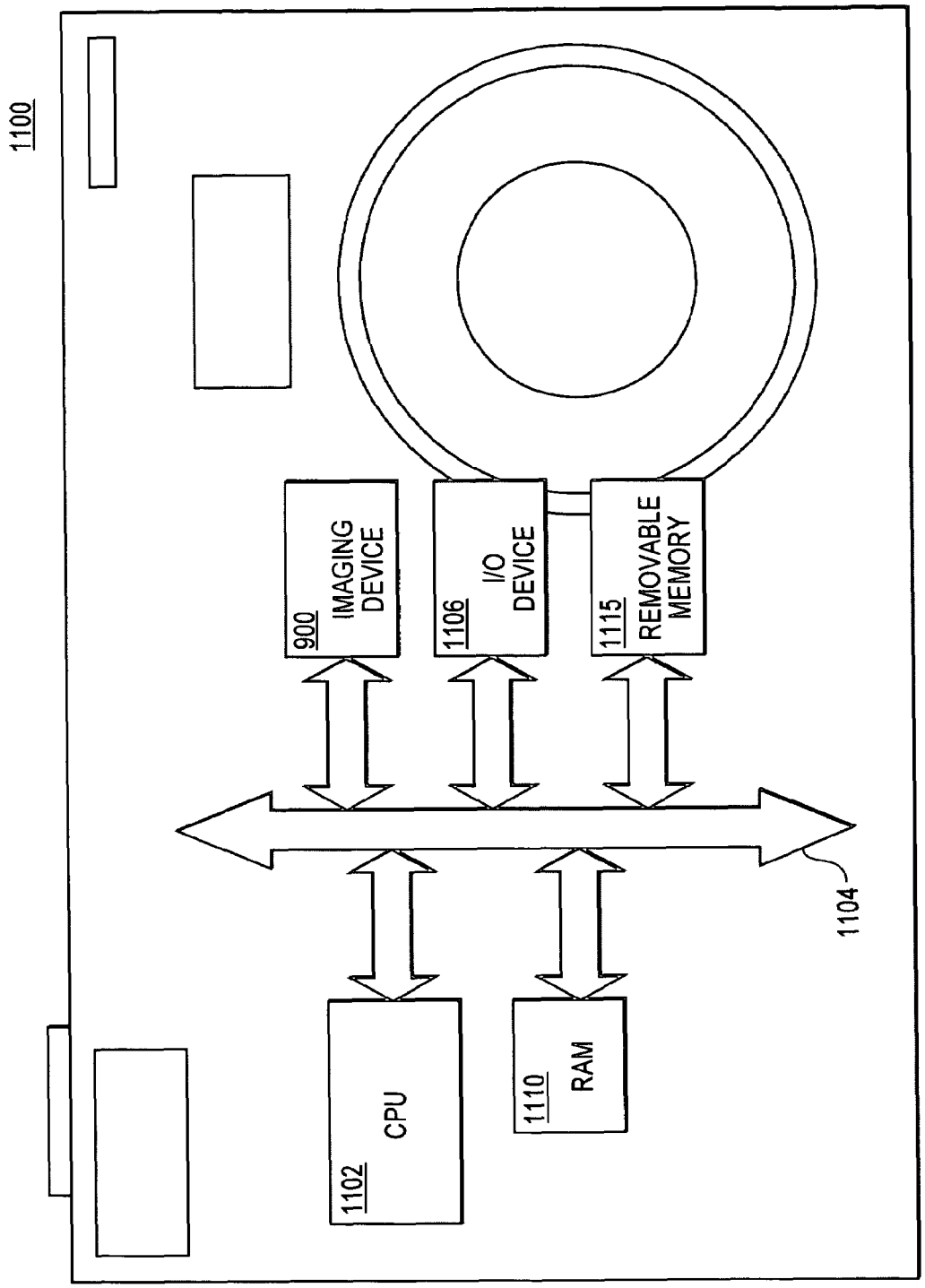
FIG. 10 illustrates a computer system having an imager employing a lens adjustment assembly according to the present invention.

FIG. 10 illustrates a camera system 1100 that includes an imager 900 constructed in accordance with an embodiment. As discussed above, the imager 900 contains a pixel array 902 and employs a lens adjustment assembly according to any embodiment or a combination of the embodiments shown in FIGS. 1A-7. The system 1100 is an example of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other image sensing and/or processing system.

The system 1100, for example a digital still or video camera system, generally comprises a central processing unit (CPU) 1102, such as a microprocessor, that communicates with one or more input/output (I/O) devices 1106 over a bus 1104. Imaging device 800 also communicates with the CPU 1102 over the bus 1104 and controls camera functions. In this regard, CPU 1102 may provide the control signals for EAP, if not provided by image processor 180, via the I/O devices 1006 or directly. The processor system 1100 also includes random access memory (RAM) 1110, and can include removable memory 1115, such as flash memory, which also communicates with CPU 1102 over the bus 1104. Imaging device 900 may be combined with a processor, such as a CPU, digital signal processor, or microprocessor, with or without memory storage on a single integrated circuit or on a different chip than the processor. Although FIG. 10 shows one bus 1104 for communication among the separate components, it should be understood that one or more busses and/or bridges may be used as well.

The above description and drawings are only to be considered illustrative of embodiments which achieve the features and advantages of the present invention. Modification and substitutions to specific structures can be made. Accordingly, the invention is not to be considered as being limited by the foregoing description and drawings, but is only limited by the appended claims.

What is claimed as new and desired to be protected by Letters Patent of the United States is:

1. An imager assembly comprising:
   a lens;
   a pixel array for receiving an image through said lens via an optical path;
   a moveable element for changing the optical properties of said optical path;
   an enclosed first fluid for causing movement of said movable element; and
   at least one electrically active polymer capable of changing volume in response to an applied voltage, and associated with said enclosed first fluid such that changes in volume of said electrically active polymer cause movement of said moveable element.

2. The imager assembly of claim 1, wherein said moveable element comprises a first moveable portion of a housing that forms a portion of the enclosure for the first fluid, said assembly further comprising a second fixed portion of said housing and a fluid seal between said first and second portions of said housing.

3. The imager assembly of claim 1, wherein said fluid comprises a substantially non-compressible fluid.

4. The imager assembly of claim 3, wherein said fluid comprises a perflourinated polyether fluid.

5. The imager assembly of claim 1, wherein said polymer comprises an electrostatically driven polymer.

6. The imager assembly of claim 5, wherein said polymer comprises an ionomer.

7. The imager assembly of claim 1, wherein said moveable element is elastically connected to a housing and wherein said housing, moveable element, and a substrate supporting said pixel array enclose said first fluid and wherein said lens is supported by said moveable element.

8. The imager assembly of claim 1, further comprising a fixed housing for supporting said lens and enclosing said pixel array, and wherein said moveable element comprises a transparent membrane within said housing defining a second enclosed fluid and wherein changes in volume of said electrically active polymer cause said second enclosed fluid to change in volume thereby causing movement of said transparent membrane and altering said optical properties of said optical path.

9. The imager assembly of claim 8, wherein said second enclosed fluid is around a portion of said pixel array.

10. The imager assembly of claim 9, wherein said electrically active polymer is provided within said enclosed first fluid.

11. The imager assembly of claim 8, wherein said enclosed second fluid is around a portion of said lens.

12. The imager assembly of claim 11, wherein said electrically active polymer is provided within said enclosed first fluid.

13. A method of changing the optical properties of an optical path between a lens and imaging array, said method comprising:
   applying a voltage to an electrically active polymer coupled to a moveable element, said electrically active polymer being configured to change volume in response to said applied voltage;
   said electrically active polymer being in association with an enclosed first fluid;
   said moveable element being in association with said first enclosed fluid; and said moveable element being configured such that movement of said moveable element changes the optical properties of said optical path, wherein said moveable element is part of a housing enclosing said polymer and said array, said housing supporting said lens and confining said first fluid in a manner such that changes in volume of said electrically active polymer cause movement of said moveable element.

14. A method of changing the optical properties of an optical path between a lens and imaging array, said method comprising:

applying a voltage to an electrically active polymer coupled to a moveable element, said electrically active polymer being configured to change volume in response to said applied voltage;

said electrically active polymer being in association with an enclosed first fluid;

said moveable element being in association with said first enclosed fluid such that changes in volume of said electrically active polymer cause movement of said moveable element; and said moveable element being configured such that movement of said moveable element changes the optical properties of said optical path, wherein said first fluid comprises a perflourinated polyether fluid.

15. A camera system comprising:

a processor; and an imager assembly electrically coupled to said processor comprising;

a lens;

a pixel array for receiving an image through said lens via an optical path;

a moveable element for changing the optical properties of said optical path in response to a control signal from said processor; and at least one electrically active polymer, said polymer capable of changing in volume in response to an applied voltage, wherein said changes in volume physically distort the shape of said moveable element thereby changing the optical properties of said optical path.

16. The camera system of claim 15, wherein said processor comprises an image processor which is coupled to said array for producing an image from pixel signals from said array.

17. The camera system of claim 15, wherein said processor comprises a processor which controls camera operations.

18. The camera system of claim 15, further comprising a housing supporting said lens and enclosing said pixel array, said electrically active polymer being operable to move said housing and lens relative to said pixel array.

19. The camera system of claim 18, further comprising a transparent membrane within said housing defining a sealed fluid space around a portion of one of said lens and said pixel array, further comprising a first fluid within said sealed fluid space and a second fluid outside said sealed fluid space, said electrically active polymer being operable to cause a relative displacement of said membrane relative to at least one of said lens and pixel array.

20. An imager assembly comprising:

a lens;

a moveable element for changing the optical properties of said optical path;

at least one electrically active polymer, said polymer capable of changing in volume in response to an applied voltage, wherein said changes in volume physically distort the shape of said moveable element causing a change in said optical properties.

21. The imager assembly of claim 20, wherein said movable element has a deformable sidewall, wherein said deformable sidewall is deformed by changes in volume of said electrically active polymer and said deformations of said deformable sidewall cause a movement of said lens relative to said pixel array.

22. The imager assembly of claim 21, wherein said electrically active polymer is coupled to an outside portion of said sidewall.

23. The imager assembly of claim 21, wherein said electrically active polymer is coupled to an inside portion of said sidewall.

24. An imager assembly comprising:

a substrate, comprising a pixel array;

a lens;

a moveable element for changing the optical properties of an optical path between said lens and pixel array;

at least one electrically active polymer, said polymer capable of changing in volume in response to an applied voltage, wherein said electrically active polymer is configured between a base of said movable element and said substrate and said changes in volume of said electrically active polymer alter said optical properties of said optical path.

25. The imager assembly of claim 24, wherein said moveable element is part of a housing supporting said lens and enclosing said pixel array, said electrically active polymer being operable to move said housing and lens relative to said pixel array.

26. The imager assembly of claim 24, further comprising:

an enclosed first fluid configured between said substrate and said lens; wherein said first fluid is in contact with said electrically active polymer such that changes in volume of said polymer cause movement of said moveable element;

a transparent membrane between said movable element and said substrate and around a portion of one of said pixel array and lens, wherein said transparent membrane defines a sealed fluid space and further comprises a second fluid within said sealed fluid space and said first fluid outside said sealed fluid space, said electrically active polymer being operable to cause a relative displacement of said membrane relative to at least one of said lens and pixel array.

* * * * *